Sept. 9, 1924.  1,508,360
R. N. CONWELL
ELECTRICAL METHOD AND APPARATUS
Filed May 11, 1921  2 Sheets-Sheet 1

Inventor:
Rollin N. Conwell
By Dela G. Haynes
Attorney.

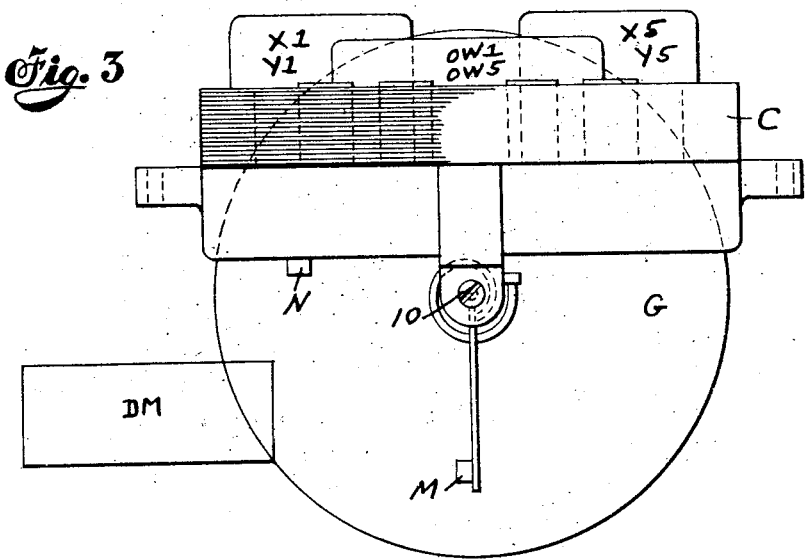

Patented Sept. 9, 1924.

1,508,360

UNITED STATES PATENT OFFICE.

ROLLIN N. CONWELL, OF BLOOMFIELD, NEW JERSEY.

ELECTRICAL METHOD AND APPARATUS.

Application filed May 11, 1921. Serial No. 468,585.

*To all whom it may concern:*

Be it known that I, ROLLIN N. CONWELL, a citizen of the United States, and a resident of Bloomfield, county of Essex, State of New Jersey, have invented an Improvement in Electrical Methods and Apparatus, of which the following is a specification.

This invention relates to electrical methods and apparatus, and with regard to certain more specific features, to methods and apparatus for use in connection with alternating currents.

Among the several objects of the invention may be noted the provision of inexpensive and durable electrical apparatus for effecting the various results hereinafter indicated, utilizing inductive action; and the provision of simple and reliable methods of attaining such results. Other objects will be in part obvious and in part pointed out hereinafter.

The invention accordingly comprises the features of construction, steps and sequence of steps, combinations of elements and arrangements of parts, which are exemplified in the description hereinafter in connection with the accompanying drawings, and the scope of the application of which will be indicated in the following claims.

In the accompanying drawings, in which are illustrated diagrammatically two of various possible embodiments of the invention, Fig. 1 is an elevation of one form of apparatus;

Fig. 3 is a plan of the parts shown in Fig. 1, excluding the connections.

Similar reference characters indicate corresponding parts throughout the several views of the drawings.

Figure 1.

Figure 1:
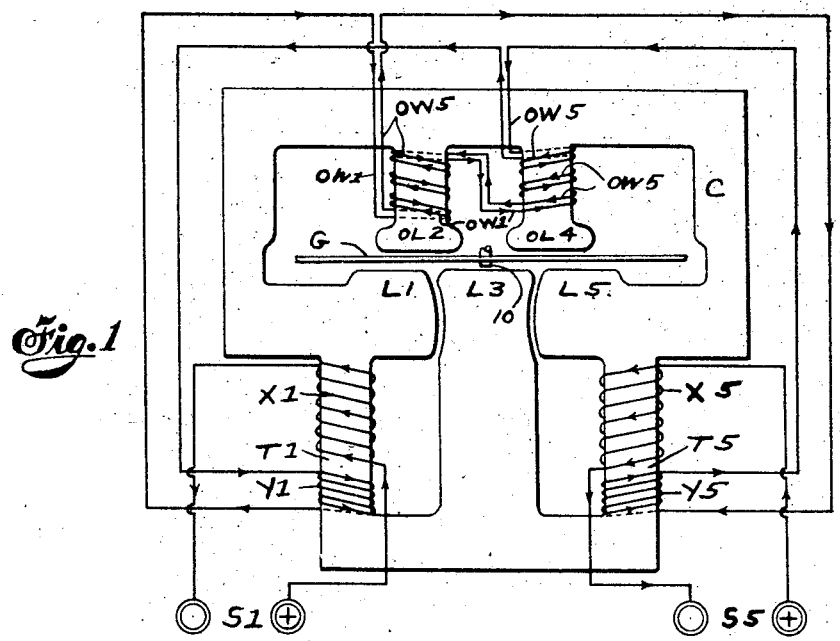

*Construction.*—Referring now more particularly to Fig. 1, there are illustrated at $S^1$, $S^5$, two sources of alternating current, which may be derived from one or more circuits; a transformer $T^1$, $T^5$ for each of said respective sources; an induction device such as the primary winding $X^1$, $X^5$ for each of said respective transformers; a leg or pole piece or core element $L^1$, $L^5$ for each of said respective transformers; and a secondary winding $Y^1$, $Y^5$ for each of said respective transformers.

The transformer fluxes are due to the magneto-motive forces of the ampere turns of the primary and secondary windings of the respective transformers.

Another flux is induced by current passing through two other windings $OW^1$, $OW^5$ connected to the respective secondary windings $Y^1$, $Y^5$ of the transformers. These two other windings are each wound upon two legs $OL^2$, $OL^4$ in such manner that their magneto-motive forces normally oppose one another. The net flux, if other than zero, cooperates with the transformer fluxes. These several fluxes induce electric currents in one or more conductors, for some useful purpose. In the present embodiment of the invention (see Figs. 1 and 3) the conductor is a movable element, to wit, a disc G pivoted as at 10 to one side of the plane of the laminated core C. The disc is driven by the vectorial sum of the forces acting upon it, that is, the resultant force arising from the reaction of the resultant flux and the flux caused by the electric currents induced thereby in the driven element G. The driven element G may simply allow an observer to determine its position and direction of movement, as in synchronizers. Or the driven element may deliver mechanical power for power purposes, or run a totalizer or operate a pointer or recording device (stylus or the like) or contacts or the like.

In the present instance the apparatus is illustrated as a relay, and the disc G is normally stationary. Upon any departure from normal condition, the disc tends to rotate in one direction or the other, retarded if desired by one or more drag magnets DM (Fig. 3) and the torque developed is determined by the magnitude of the abnormality that causes the torque. Such torque may be used for any of the several purposes above named, for which such torque may be suitable.

*Normal condition.*—In tracing the several currents and fluxes during normal condition, assume the two sources of power $S^1$, $S^5$ to be in phase, and the ampere turns in the two primaries equal, and assume an instant when the right-hand conductor at each source of power is plus, as indicated in Fig. 1. At this time, current in primary $X^1$ flows to the left on the front side of the winding, inducing in secondary $Y^1$ a current flowing to the right on the front side of the latter winding. The latter current flows to the left through the front side of the other winding $OW^1$ on the left leg $OL^2$, and to the right through the front side of said winding $OW^1$ on the right leg $OL^4$. Current in primary $X^5$ flows to the left on the front side of the winding, inducing in secondary $Y^5$ a current flowing to the right on the front side of the latter winding. The latter current flows to the right through the front side of the other winding $OW^5$ on the left leg $OL^2$, and to the left through the front side of said winding $OW^5$ on the right leg $OL^4$. The proportioning of the windings and other factors is preferably such that this opposite flow of currents in the other windings $OW^1$, $OW^5$ produces normally zero flux in the legs $OL^2$, $OL^4$. As there is no traveling field acting on the disc, the disc does not rotate.

*Abnormal condition I—Caused by relative increase of current at source $S^1$.*—In tracing the several currents and fluxes upon a departure from normal condition, assume the currents at the sources of power $S^1$, $S^5$ in phase, and the current at the source $S^1$ larger than normal with respect to current at source $S^5$. At this time, the directions of the several currents are the same as during normal condition. The fluxes, however, are different. The transformer flux flowing through legs $L^1$ and $L^3$ is of greater magnitude than the transformer flux flowing through legs $L^3$ and $L^5$. The current in the secondary $Y^1$ and hence in the other winding $OW^1$ is thus greater than the current in secondary $Y^5$ and other winding $OW^5$. The flux due to the differential action of other windings $OW^1$, $OW^5$ is no longer zero, but has a magnitude determined by the extent of inequality between the ampere turns in the other windings $OW^1$, $OW^5$. That is, the larger the difference between the currents in the other windings, the larger is the other flux; and with the current in winding $OW^1$ the greater, the other flux has one phase relation with the transformer fluxes, while if the current in winding $OW^5$ were the greater, the other flux would have a different phase relation with the transformer fluxes.

(A) Assume the instant when the right-hand conductor at each source of power is plus. The leg $L^1$ at the portion adjacent the disc G is therefore zero, and the same is true of the leg $L^5$, so far as the transformer fluxes therein are concerned. The leg $L^3$ is of opposite polarity to legs $L^1$, $L^5$ and is also zero. The net flux due to the preponderance of winding $OW^1$ over winding $OW^5$ in this instance lags behind the transformer fluxes. The extent of lag, for the purpose of the analysis hereinafter, may be considered as nominally ninety degrees; for brevity the term quadrature is used herein as indicating any out-of-phase relationship (not necessarily ninety degrees) that will effect the respective action specified. The upper legs $OL^2$, $OL^4$ are thus plus and minus, respectively. At this instant, then, the five legs $L^1$, $OL^2$, $L^3$, $OL^4$, $L^5$ are respectively zero, plus, zero, minus, zero.

(B) Assume now an instant one-quarter cycle later. The two terminals at each source of power are now of zero potential, producing zero current in each primary $X^1$, $X^5$; there is thus minus polarity at legs $L^1$ and $L^5$ and plus at leg $L^3$. Since the other flux lags ninety degrees behind the transformer fluxes, said other flux is now zero at the legs $OL^2$ and $OL^4$. At this instant, then, the five legs are respectively minus, zero, plus, zero, minus, which means that the plus polarity has traveled from leg $OL^2$ to leg $L^3$.

(C) Assume now an instant another one-quarter cycle later. The right-hand terminal at each source of power is now minus, and the several currents and fluxes are thus one-half cycle behind their directions and values at the initial instant, indicated in paragraph A above. The five legs are thus now respectively zero, minus, zero, plus, zero, which means that the plus polarity has traveled from leg $L^3$ to leg $OL^4$.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The five legs are thus now respectively plus, zero, minus, zero, plus, which means that the plus polarity has traveled from leg $OL^4$ to leg $L^5$ and appears at leg $OL^2$.

(E) Assume now an instant another one-quarter cycle later, that is, an entire cycle later than the condition in paragraph A. The five legs are now of the same polarity as at the instant in paragraph A, namely, respectively zero, plus, zero, minus, zero, which means that the plus polarity has traveled from leg $L^1$ to leg $OL^2$.

The traveling field thus produced causes electric currents in the disc G, and the reaction between said flux or field and the flux caused by said currents produces torque in the disc.

*Abnormal condition II—Caused by relative increase of current at sources $S^5$.*— Next may be traced the several currents and fluxes when the departure from normal condition is caused by the current at the source $S^5$ becoming larger than normal with respect to the current at source $S^1$.

(A) Assume first the instant when the right-hand conductor at each source of power is plus. The leg $L^1$ at the portion adjacent the disc G is now zero, and the same is true of the leg $L^5$, so far as the transformer fluxes therein are concerned. The leg $L^3$ is of opposite polarity to legs $L^1$, $L^5$ and is also zero. The net flux due to the preponderance of winding $OW^3$ over winding $OW^1$ may be considered as ninety degrees ahead of the transformer fluxes. At the instant in question, the leg $OL^2$ is minus and the leg $OL^4$ is plus. At this instant then, the five legs are respectively zero, minus, zero, plus, zero.

(B) Assume now an instant one-quarter cycle later. The two terminals at each source of power are now of zero potential, producing zero current in each primary $X^1$, $X^5$; there is thus minus polarity at legs $L^1$, $L^5$. Since the other flux leads the transformer fluxes by ninety degrees, said other flux is now zero at legs $OL^2$ and $OL^4$. At this instant, then, the five legs are respectively minus, zero, plus, zero, minus, which means that the plus polarity has traveled from leg $OL^4$ to leg $L^3$, or in an opposite direction to its direction of travel during the corresponding quarter-cycle A—B during abnormal condition I.

(C) Assume now an instant another one-quarter cycle later. The left-hand terminal at each source of power is now plus, and the several currents and fluxes are thus one-half cycle behind their directions and values at the initial instant A. The five legs are thus now respectively zero, plus, zero, minus, zero, which means that the plus polarity has traveled from leg $L^3$ to leg $OL^2$.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The five legs are thus now respectively plus, zero, minus, zero, plus, which means that the plus polarity has traveled from leg $OL^2$ to leg $L^1$ and also appears at leg $L^5$.

(E) Assume now an instant another one-quarter cycle later, that is, an entire cycle later than the condition in paragraph A. The five legs are now of the same polarity as at the instant in paragraph A, namely, respectively zero, minus, zero, plus, zero, which means that the plus polarity has traveled from leg $L^5$ to leg $OL^4$.

*Résumé*—Thus an excess of current at the source of power $S^1$ relative to the current at source $S^5$ (abnormal condition I) causes travel of plus polarity and hence torque in one direction while a relative excess of current at the source of power $S^5$ (abnormal condition II) causes travel of plus polarity and hence torque in the opposite direction. In the latter case, as in the former, the magnitude of said relative excess of current determines the magnitude of the torque, for the reasons above noted.

The apparatus is thus simple in construction, may be made sensitive to small departures from normal condition, and is yet rugged enough to endure severe service conditions.

Figure 2:
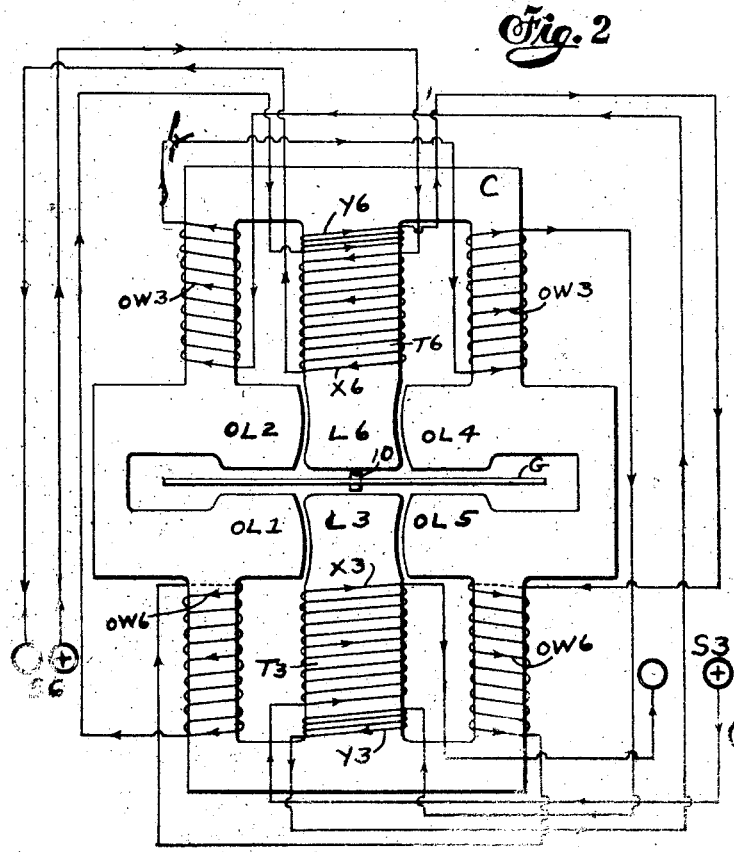
Fig. 2 is a similar view of a modification.

*Figure 2.*

In the modification illustrated in Fig. 2, there are two sources $S^3$, $S^6$ of alternating current, which may be derived from one or more circuits. The transformer $T^3$, comprising primary $X^3$ and secondary $Y^3$, is mounted on a leg $L^3$, the free end of which is adjacent the movable element G. Similarly the transformer $T^6$, comprising primary $X^6$ and secondary $Y^6$, is mounted on a leg $L^6$, the free end of which is also adjacent the movable element G. Windings $OW^3$ are in circuit with secondary $Y^3$ and are so positioned upon legs $OL^2$ and $OL^4$ as to act cumulatively in producing a flux through these two legs. Similarly windings $OW^6$ are in circuit with secondary $Y^6$ and are so positioned upon legs $OL^1$ and $OL^5$ as to act cumulatively with one another in producing a flux through these two legs.

*Normal condition.*—During normal condition, with equal fluxes in the two transformers, and equal fluxes induced by the two sets of other windings $OW^3$, $OW^6$, the disc does not rotate.

*Abnormal condition I—Caused by relative increase of current at source $S^3$.*—When the current at source $S^3$ increases with respect to the current at source $S^6$, the currents flow as during normal condition, but the fluxes are different. The flux in transformer $T^3$ is relatively greater than before, and the current in secondary $Y^3$ and hence in the other winding $OW^3$ has relatively increased, thereby relatively increasing the flux in legs $OL^2$ and $OL^4$ due to the latter current. Thus the fluxes in legs $OL^2$ and $OL^4$ dominate the fluxes in legs $OL^1$ and $OL^5$.

(A) Assume the instant when the right-hand conductor at each source of power is plus, as in Fig. 2. The currents then flow as indicated by the arrows in Fig. 2. The leg $L^3$ at the portion adjacent the disc G is therefore zero, and the same is true of the leg $L^6$, so far as the transformer fluxes therein are concerned. The net flux due to the preponderance of winding $OW^3$ over winding $OW^6$ is assumed as ninety degrees behind the transformer fluxes. At the instant in question, the leg $OL^2$ is thus plus and the leg $OL^4$ is minus. Since the flux in $L^3$ predominates over the flux in $L^6$, the flux in the latter may be disregarded. The polarity of legs $OL^1$ and $OL^5$ is opposite to that of leg $L^3$ at this time and is there zero. At this instant, then, the five legs $OL^1$, $OL^2$, $L^3$, $OL^4$ and $OL^5$ are respectively zero, plus, zero, minus, zero.

(B) Assume now an instant one-quarter cycle later. The two terminals at each source of power are now at zero potential, producing zero current in each primary $X^3$, $X^6$. The fluxes are one-quarter cycle later than at instant A, and the five legs are thus respectively minus, zero, plus, zero, minus, which means that the plus polarity has traveled from leg $OL^2$ to leg $L^3$.

(C) Assume now an instant another one-quarter cycle later. The five legs are thus now respectively zero, minus, zero, plus, zero, which means that the plus polarity has traveled from leg $L^3$ to leg $OL^4$.

(D) Assume an instant another one-quarter cycle later, that is, three-quarters of a cycle later than the condition in paragraph A. The five legs are now respectively plus, zero, minus, zero, plus, which means that the plus polarity has traveled from leg $OL^4$ to leg $L^5$, and appears at $OL^1$.

(E) Assume an instant another one quarter cycle later, that is, an entire cycle later than the condition in paragraph A. The five legs are now of the same polarity as at the instant in paragraph A, namely, respectively, zero, plus, zero, minus, zero, which means that the plus polarity has traveled from leg $L^1$ to leg $OL^2$.

The traveling field thus produced causes electric currents in the disk G, and the reaction between said flux or field and the flux caused by said currents produces torque in the disk, tending to cause clockwise rotation of the disk (Fig. 3).

*Abnormal condition II—Caused by relative increase of current at source $S^6$.*—In tracing the fluxes when the departure from normal condition is caused by the current at the source $S^6$ becoming larger than normal with respect to the current at source $S^3$, the occurrences above indicated during abnormal condition I, apply in a reverse sense. That is, the flux in leg $L^6$ now predominates over the flux in leg $L^3$ and the polarity of the latter leg may thus be disregarded; and the flux in legs $OL^1$ and $OL^5$ predominates over the flux in legs $OL^2$ and $OL^4$. Analysis of the polarities throughout a cycle shows that the torque produced in the disc now tends to rotate the disc in the direction opposite to the direction during abnormal condition I.

Thus, an excess of current at the source of power $S^3$, relative to the current at source $S^6$ (abnormal condition I) causes travel of plus polarity and hence torque in one direction, while a relative excess of current at the source of power $S^6$ (abnormal condition II) causes travel of plus polarity and hence torque in the opposite direction, tending to cause counterclockwise rotation of the disk (Fig. 3). In both cases, the magnitude of said relative excess of current determines the magnitude of the torque, for the reasons above noted.

*In general.*

If during normal condition, the two sources of power of the relay are out of phase with one another by an acute angle, the relay still does not rotate, and, during abnormal conditions, if the two sources of power be out of phase with one another, the directions of rotation will be unchanged.

The above also applies to embodiments of the invention in apparatus other than relays, that is, an acute angle out-of-phase relation between the currents at the two sources does not cause the resultant field to travel when the ampere turns in the two primaries are equal, but does cause it to travel in one direction or the other when such ampere-turns are unequal. During the former condition, there is a flux through the poles $OL^2$, $OL^4$, but the phase relation of the flux with respect to the transformer flux is such that no traveling field is produced.

From the above it will be seen that the several objects of the invention are attained and other advantageous results achieved.

As many modifications of the embodiment above illustrated might be made without departing from the spirit or scope of the present invention, it is intended that the above description and accompanying drawings and claims shall be interpreted as illustrative and not in a limiting sense.

I claim:

1. In apparatus of the class described, in combination, a plurality of magnetically co-acting induction devices, primary and secondary windings therefor, said primary windings adapted to be energized from two sources of power, and means cooperating with said secondary windings for producing fluxes coacting with the fluxes of said induction devices to set up traveling magnetic fields.

2. In apparatus of the class described, in combination, two magnetically co-acting induction devices, primary and secondary windings therefor, said primary windings adapted to be energized respectively from two sources of power, and means cooperating with said secondary windings for producing fluxes coacting with the fluxes of said induction devices to set up traveling magnetic fields.

3. In apparatus of the class described, in combination, a plurality of transformers, primary and secondary windings therefor, each of said primary windings adapted to be energized from a source of power, means cooperating with said secondary windings for producing fluxes substantially in quadrature with the transformer fluxes, means for combining said transformer fluxes and said other fluxes to produce traveling fields, and a member responsive to said traveling fields.

4. In apparatus of the class described, in combination, a plurality of transformers, primary and secondary windings therefor, means for combining said transformer fluxes, each of said primary windings adapted to be energized from a source of power, means cooperating with said secondary windings for producing fluxes substantially in quadrature with the resultant of the transformer fluxes, means for combining said transformer fluxes and said other fluxes to produce traveling fields, and a member responsive to said traveling fields.

5. In apparatus of the class described, in combination, two transformers, means for combining the fluxes thereof, primary and secondary windings for the transformers, each of said primary windings adapted to be energized from a source of power, and means cooperating with said transformers for setting up traveling magnetic fields, the direction of travel of the traveling fields reversing upon reversal of relative predominance of strength of current in the primary windings of the respective transformers.

6. In apparatus of the class described, in combination, two transformers, means for combining the fluxes thereof, primary and secondary windings for the transformers, each of said primary windings adapted to be energized from a source of power, and means cooperating with said secondary windings and said transformer fluxes for setting up traveling magnetic fields.

7. In apparatus of the class described, in combination, a plurality of magnetically coacting transformers, primary and secondary windings therefor, said primary windings adapted to be energized from sources of power, means cooperating with said secondary windings for setting up traveling magnetic fields, and a movable member responsive to said traveling fields, the direction of travel of the traveling fields being dependent upon the relative magnitude of the currents in the respective primary windings.

8. In apparatus of the class described, in combination, a plurality of magnetically coacting transformers, primary and secondary windings therefor, said primary windings adapted to be energized from sources of power, and means cooperating with said secondary windings for producing fluxes coacting with the transformer fluxes to set up traveling magnetic fields when the current strength in the primary winding of one of said transformers exceeds the current strength in the primary winding of another of said transformers.

9. In apparatus of the class described, in combination, a plurality of magnetically coacting induction devices, primary and secondary windings therefor, said primary windings adapted to be energized from sources of power, and means cooperating with said secondary windings for setting up traveling magnetic fields when the current strength in the primary winding of one of said induction devices exceeds the current strength in the primary winding of another of said induction devices, the direction of travel of said traveling fields changing when the predominance of current strength shifts from the primary winding of one transformer to the primary winding of the other transformer.

10. In apparatus of the class described, in combination, a plurality of magnetically coacting induction devices, primary and secondary windings therefor, said primary windings adapted to be energized from sources of power, and means cooperating with said secondary windings for setting up traveling magnetic fields; a movable member; and means whereby said traveling fields tend to cause movement of said member, the magnitude of the force tending to cause said movement being dependent upon the relative magnitude of the currents in said sources.

11. In apparatus of the class described, in combination, a plurality of magnetically co-acting induction devices, primary and secondary windings therefor, said primary windings adapted to be energized from sources of power, and means cooperating with said secondary windings for setting up traveling magnetic fields; a movable member; and means whereby said traveling fields tend to cause movement of said member, the magnitude of the force tending to cause said movement being dependent upon the relative magnitude of the currents in said sources, the direction of said force being dependent upon which of said currents predominates.

12. In apparatus of the class described, in combination, two transformers, a primary winding for each of said transformers, each of said primary windings being adapted to be connected to a source of power, secondary windings for said transformers, means for combining the transformer fluxes, means connected to the respective secondaries and adapted to produce other fluxes substantially in quadrature with the respective transformer fluxes, means for combining said other fluxes, and means for combining the resultant of the transformer fluxes with the resultant of said other fluxes, to form a traveling field.

13. In apparatus of the class described, in combination, two transformers, a primary winding for each of said transformers, each of said primary windings being adapted to be connected to a source of power, secondary windings for said transformers, means for combining the transformer fluxes, means connected to the respective secondaries and adapted to produce other fluxes substantially in quadrature with the respective transformer fluxes, means for combining said other fluxes, means for combining the resultant of the transformer fluxes with the resultant of said other fluxes, to form a traveling field; a movable member; and means whereby said traveling field tends to cause movement of said member.

14. In apparatus of the class described, means for obtaining fluxes from a plurality of current sources, means for producing by means of said fluxes currents of substantially opposite phase to the respective currents of the said current sources, means whereby said produced currents produce fluxes substantially in quadrature with the transformer fluxes, means for combining the transformer fluxes, means for combining said other fluxes, and means for combining the resultant of the transformer fluxes with the resultant of said other fluxes to form a traveling field.

15. In apparatus of the class described, means for obtaining fluxes from a plurality of current sources, means for producing by means of said fluxes currents of substantially opposite phase to the respective currents of the said current sources, means whereby said produced currents produce fluxes substantially in quadrature with the transformer fluxes, means for combining the transformer fluxes, means for combining said other fluxes, means for combining the resultant of the transformer fluxes with the resultant of said other fluxes to form a traveling field; a movable member; and means whereby said traveling field tends to cause movement of said member, the magnitude and direction of the force tending to cause said movement being dependent upon the relative magnitude of the currents in said sources.

16. The method of inducing currents in a conductor, which comprises producing magnetically co-acting fluxes from a plurality of sources of power, producing from the said fluxes fluxes in quadrature with the first fluxes, and causing said several fluxes to combine to form one or more traveling fields inducing currents in said conductor.

17. The method of inducing currents in a conductor, which comprises producing magnetically co-acting fluxes from a plurality of sources of power, producing from the respective sources fluxes in quadrature with the first fluxes, and causing said several fluxes to combine to form one or more traveling fields inducing currents in said conductor.

18. The method of producing forces, which comprises producing magnetically co-acting fluxes from a plurality of sources of power, producing from the said fluxes fluxes in quadrature with the first fluxes, and causing said several fluxes to combine to form one or more traveling fields, inducing currents in a movable member, the reactions between fluxes caused thereby and the traveling fields tending to move said member.

19. The method of producing forces, which comprises producing magnetically co-acting fluxes from a plurality of sources of power, producing from the respective sources fluxes in quadrature with the first fluxes, and causing said several fluxes to combine to form one or more traveling fields, inducing currents in a movable member, the reactions betwen fluxes caused thereby and the traveling fields tending to move said member.

20. In an apparatus of the class described, in combination, two magnetically co-acting induction devices, primary and secondary windings therefor, said primary windings adapted to be energized from two sources of power, and means cooperating with said secondary windings for producing fluxes co-acting with the transformer fluxes to set up rotating magnetic fields.

In testimony whereof, I have signed my name to this specification this ninth day of May, 1921.

ROLLIN N. CONWELL.